US006749306B2

(12) United States Patent
Lindsay

(10) Patent No.: US 6,749,306 B2
(45) Date of Patent: Jun. 15, 2004

(54) MIRROR DRYING DEVICE

(76) Inventor: James D. Lindsay, 22280 Grace Hill La., Athens, AL (US) 35614

( * ) Notice: Subject to any disclaimer, the term of this patent is extended or adjusted under 35 U.S.C. 154(b) by 0 days.

(21) Appl. No.: 10/214,739

(22) Filed: Aug. 9, 2002

(65) Prior Publication Data

US 2004/0027665 A1 Feb. 12, 2004

(51) Int. Cl.$^7$ .................................................. G02B 1/00
(52) U.S. Cl. ....................................................... 359/509
(58) Field of Search ................................. 359/507, 508, 359/509, 510, 511, 512, 513, 514

(56) References Cited

U.S. PATENT DOCUMENTS

| 3,059,540 | A | * | 10/1962 | Robinson | 359/509 |
|---|---|---|---|---|---|
| 3,455,624 | A | * | 7/1969 | Godfrey | 359/509 |
| 4,134,612 | A | * | 1/1979 | Nelson | 296/91 |
| 4,248,497 | A | * | 2/1981 | Leighton | 359/509 |
| 4,550,988 | A | | 11/1985 | Harder et al. | |
| 4,718,755 | A | | 1/1988 | Olson et al. | |
| 4,869,581 | A | | 9/1989 | Matulich | |
| 4,898,458 | A | | 2/1990 | McDonald | |
| 4,963,011 | A | | 10/1990 | Lu et al. | |
| 4,979,809 | A | | 12/1990 | Peters | |
| 5,179,470 | A | | 1/1993 | Olson | |
| 5,815,315 | A | * | 9/1998 | Garland et al. | 359/509 |
| 6,290,361 | B1 | * | 9/2001 | Berzin | 359/507 |

FOREIGN PATENT DOCUMENTS

GB        2 175 552 A      12/1986

* cited by examiner

Primary Examiner—Mark A. Robinson
(74) Attorney, Agent, or Firm—Richard C. Litman

(57) ABSTRACT

A device disposed to direct a stream of air across the reflective face of an exteriorly-mounted rear view mirror on an automotive vehicle. The device is especially adaptable to large trucks whose exterior mirrors are positioned in a way to create a vacuum on the reflective face when the truck is in motion. This vacuum tends to pull moisture and foreign matter to the reflective face, thereby causing loss of vision. The device directs a stream of air over the reflective face to break the vacuum and prevent foreign matter from adhering to the face, thereby enhancing the view of the driver and reducing risk. The device is constructed in a manner to be easily mounted (only one screw is required) to a standard rear view mirror of a truck or the like.

7 Claims, 3 Drawing Sheets

MIRROR DRYING DEVICE

BACKGROUND OF THE INVENTION

1. Field of the Invention

The present invention generally relates to air deflectors. More specifically, the present invention is drawn to a device for deflecting air over the face of an external mirror of an automotive vehicle.

2. Description of the Related Art

Driving in rainy weather presents problems of visibility for the motorist due to the effect of dirt-laden water droplets being deposited on the reflective surfaces of external rear view mirrors. This phenomena is especially severe on trucks, which trucks tend to kick up a considerable amount of spray. Most trucks are designed such that air currents flowing over the truck's surface are not efficiently conducted away therefrom, thus exacerbating the deposition of the dirt-laden droplets on the mirrors.

In the past, the only available remedy was wiping the mirror manually. While wiping the driver's side mirror might be accomplished expeditiously, wiping the passenger's side mirror required that a lone driver stop and either slide over to the passenger's side or get out of the truck. Both scenarios are time consuming and possibly hazardous. A simple, inexpensive, easy-to install device which would alleviate the above problem would certainly be a welcome addition to the art.

There are many devices in the prior art which are utilized to deflect air over the surfaces of mirrors. For example, U.S. Pat. No. 4,979,809 (Peters) and UK Patent Application 2 175 552 A disclose respective air scoops for a mirror assembly. It is noted that the disclosed air scoops consist of multiple assembled parts which add to manufacturing costs.

U.S. Pat. No. 4,869,581 (Matulich) describes an air deflector which is releasably attached to a mirror with adhesive. This means of attachment is not sufficient to withstand the vibrations encountered in trucks and would surely fall off of the truck mirror.

U.S. Pat. No. 4,550,988 (Harder et al.) is drawn to a rear view mirror cleaning system. The instant system incorporates a fluid dispenser for spraying cleaning fluid on the rear view mirror. Such a system would be relatively expensive and require more than usual maintenance.

U.S. Pat. No. 4,898,458 (McDonald) requires that air intake apertures be formed in the rear view mirror housing. This design would greatly increase manufacturing costs.

U.S. Pat. Nos. 4,963,011 (Lu et al.) and 5,179,470 (Olson) show mirror housings which are configured in a streamlined, aerodynamic design. Housings of this type are relatively expensive to manufacture.

U.S. Pat. No. 4,718,755 (Olson) discloses an air turning vane incorporated in the mirror structure. As in the patents cited immediately above, this design would be expensive to manufacture.

None of the above inventions and patents, taken either singularly or in combination, is seen to disclose a simplistic, inexpensive mirror drying device as will subsequently be described and claimed in the instant invention.

SUMMARY OF THE INVENTION

The present invention is drawn to a device disposed to direct a stream of air across the reflective face of an exteriorly-mounted rear view mirror on an automotive vehicle. The instant device is especially adaptable to large trucks whose exterior mirrors are positioned in a way to create a vacuum on the reflective face when the truck is in motion. This vacuum tends to pull moisture and foreign matter to the reflective face, thereby causing loss of vision. The device of the instant invention directs a stream of air over the reflective face to break the vacuum and prevent foreign matter from adhering to the face, thereby enhancing the view of the driver and reducing risk. As contemplated, the device is fabricated from a relatively thin, one-piece, metal sheet. The sheet is constructed in a manner to be easily mounted (only one screw is required) to a standard rear view mirror of a truck or the like.

Accordingly, it is a principal object of the invention to provide a device, which device redirects air flow over the reflective face of an exteriorly-mounted rear view mirror of a vehicle when the vehicle is in motion.

It is another object of the invention to provide a device, which device redirects air flow over the reflective face of an exteriorly-mounted rear view mirror of a vehicle in a manner to prevent water droplets and other foreign matter from adhering to the face of the mirror.

It is a further object of the invention to provide a device, which device can be easily attached to a standard, exteriorly-mounted rear view mirror.

Still another object of the invention is to provide a device which consists of a one-piece metal sheet.

It is an object of the invention to provide improved elements and arrangements thereof for the purposes described which are inexpensive, dependable and fully effective in accomplishing their intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
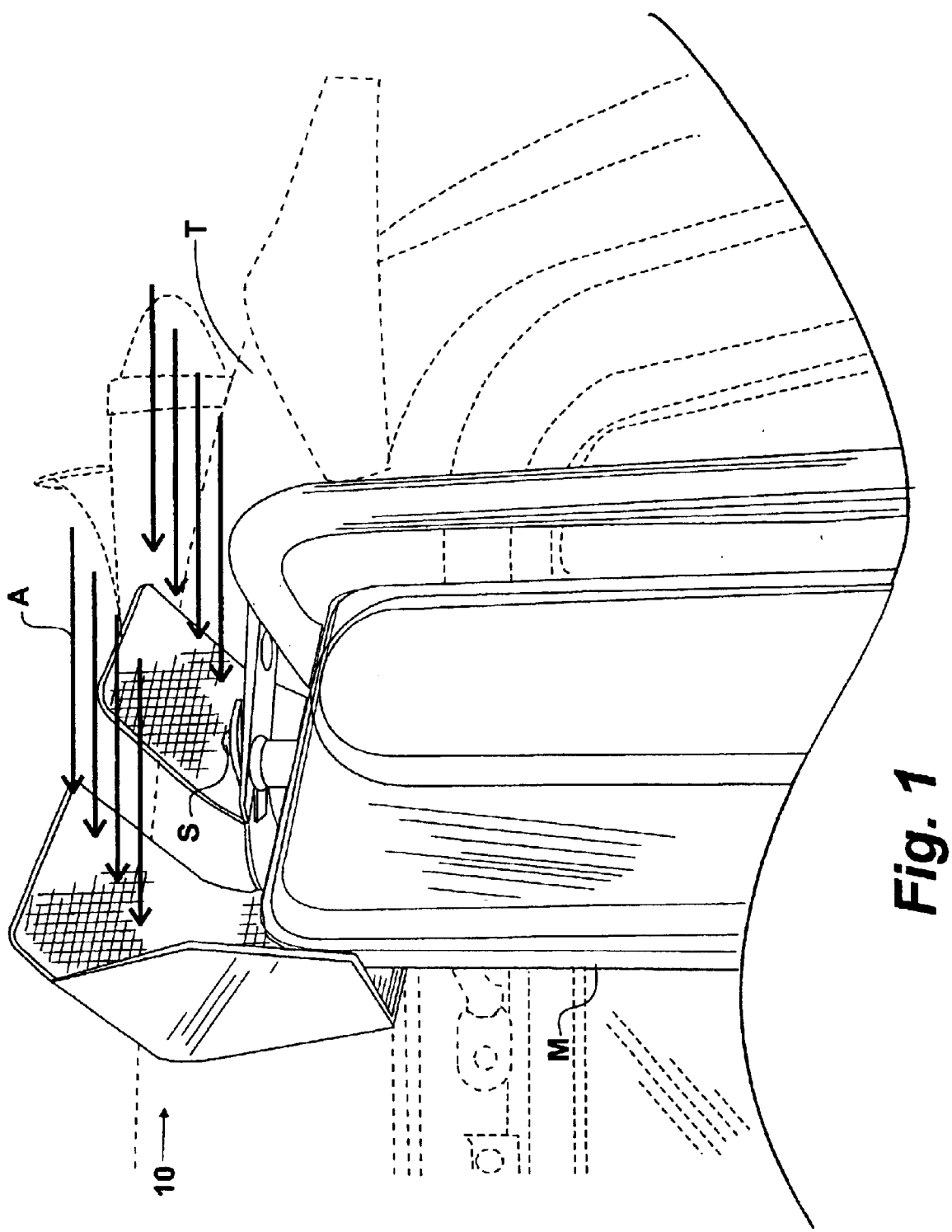
FIG. 1 is an environmental, perspective view of a mirror-drying device according to the present invention.

Attention is first directed to FIG. 1 wherein the device of the instant invention is generally indicated at 10 and is mounted to an exterior, rear view mirror M of a truck T (shown in phantom lines). A single fastener S is utilized to attach the device to the mirror. Device 10 functions to redirect air streams A over the reflective face (not shown) of the mirror when the truck is in motion.

Figure 2:
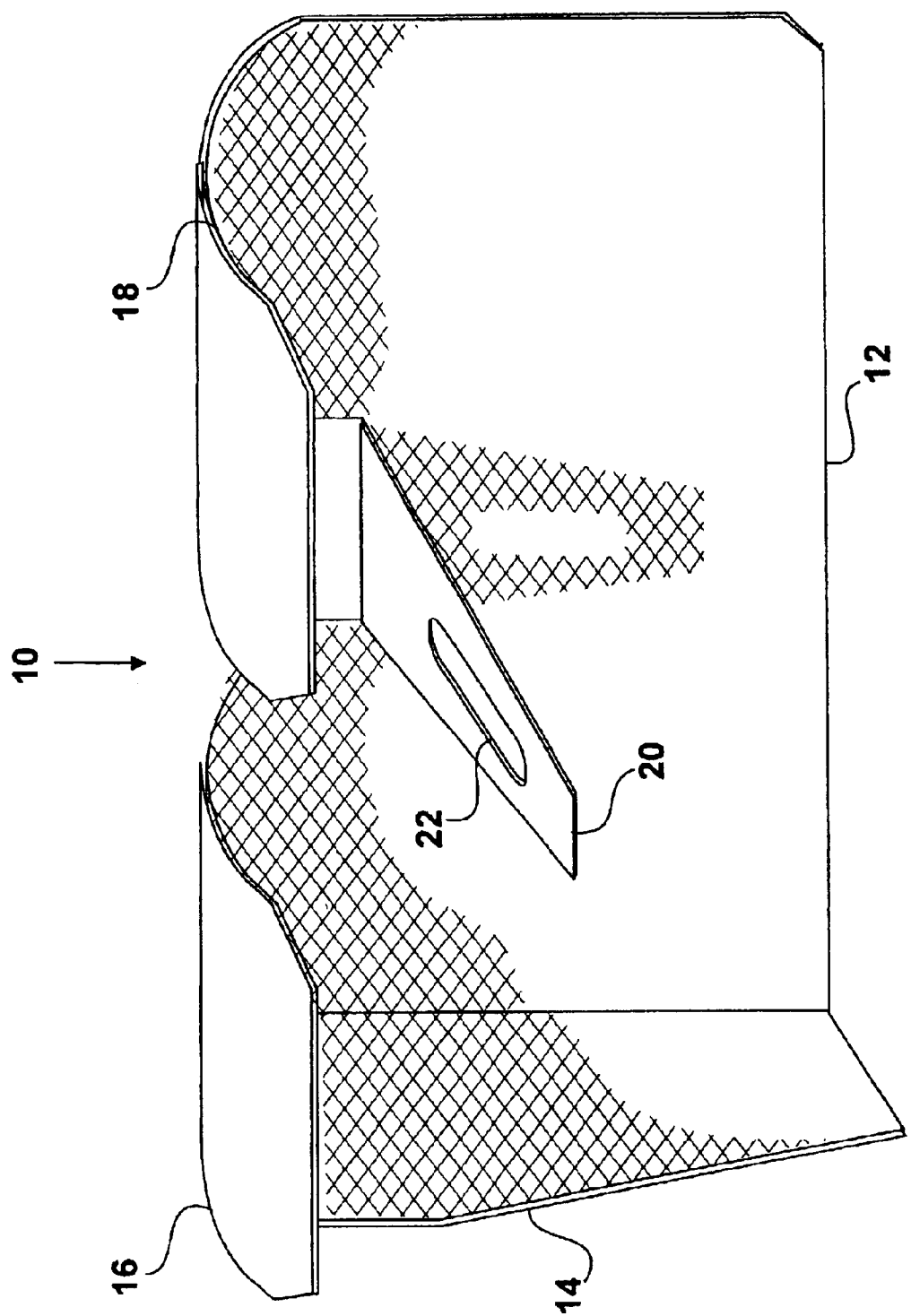
FIG. 2 is a perspective view of a mirror-drying device according to the present invention.

As best seen in FIG. 2, device 10 is fabricated from a thin sheet configured to have a solid rear wall 12 having front and rear faces. A wall 14 is formed at one side of wall 12 and is substantially perpendicular thereto. Wall 14 functions to close the side of the device which is away from the cab of the truck, thereby ensuring that the directed air stream is contained to flow across the face of the mirror. The upper end of wall 12 is cut out and bent so as to present curved air directing portions 16 and 18. Curved portions 16, 18 are bent toward the front face of wall 12 and form angles of approximately a one-hundred-five degrees. An attachment member 20 is cut out of wall 12 and is bent forwardly so as to form an angle of approximately ninety degrees with wall 12. Attachment member 20 has an elongated opening 22 formed therein opening 22 is adapted to receive a single fastener (screw, bolt, etc.) for attaching the device to the mirror.

Figure 3:
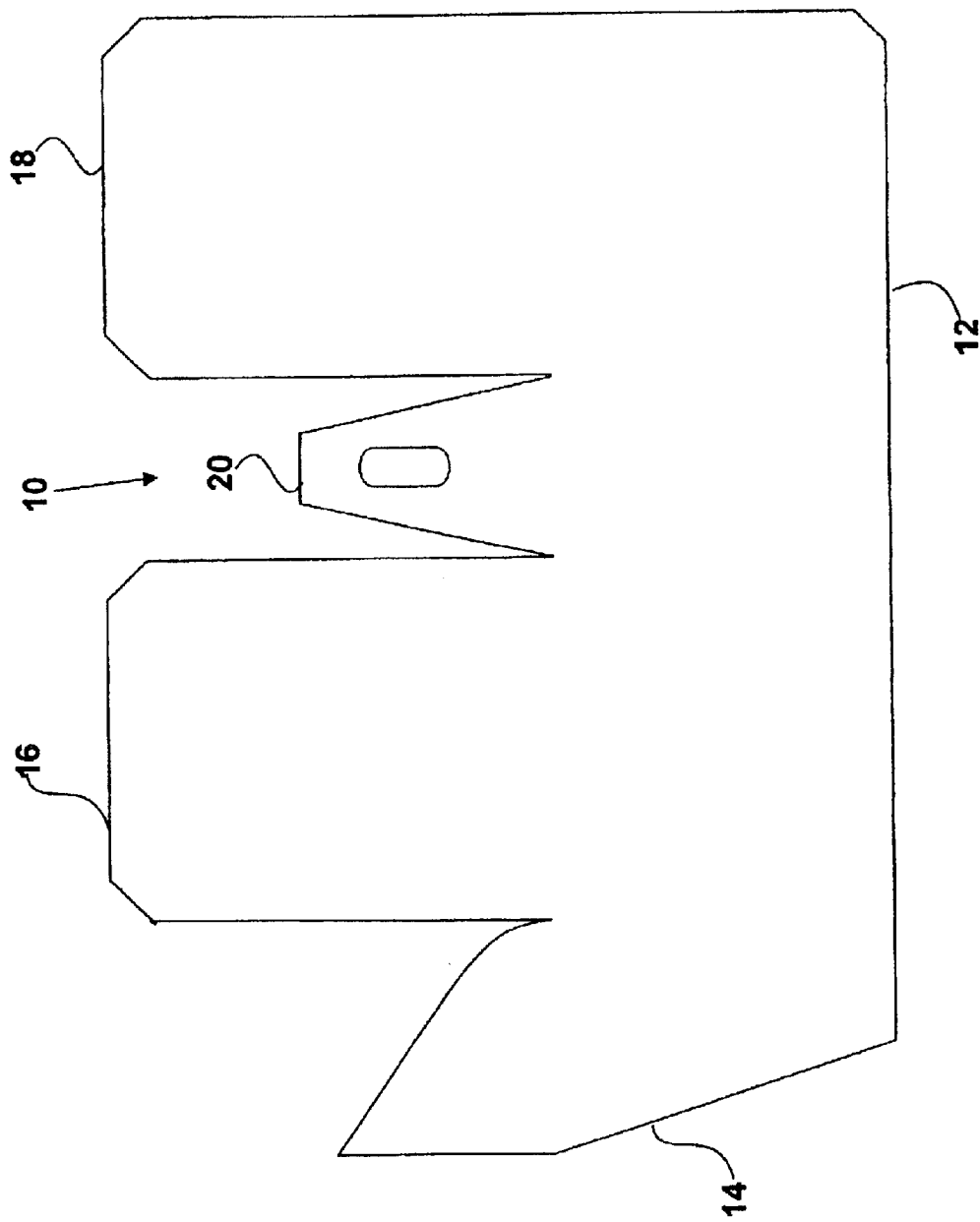
FIG. 3 is a plan view of a mirror-drying device according to the present invention.

FIG. 3 is illustrative of the device in a flat, laid-out position. As indicated above, the device comprises a one-piece metal sheet. Although metal is the preferred material it should be noted that other suitable materials i.e. plastic may be utilized. The overall dimensions of the laid-out sheet are approximately six inches high and nine and one-fourth inches wide. The sheet may be stamped or cut out to form the laid-out configuration as shown. The dimensions of the side wall 14 and air directing portions 16 and 18 are determined within ranges needed to fashion the device as shown in FIG. 2.

It is to be understood that the present invention is not limited to the embodiment described above, but encompasses any and all embodiments within the scope of the following claims.

I claim:

1. A device for directing air across the reflective face of an externally mounted rear view mirror, said device comprising:
   a sheet member having a front face, an upper end a first side and a second side;
   a side wall extending from the first side of said sheet member at an angle therewith;
   a first air-directing member member extending from the upper end of said sheet member at an angle therewith, wherein said first air-directing member is positioned adjacent the first side of said sheet member and is in abutment with said side wall;
   a second air-directing member extending from the upper end of said sheet member at an angle therewith, wherein said second air-directing member is laterally spaced from said first air-directing member;
   said first air-directing member and said second air-directing member extending from said upper end at an angle of approximately one-hundred-five degrees with said front face of said sheet member;
   an attachment member extending from the upper end of said sheet member at an angle therewith, wherein said attachment member is positioned between said first air-directing member and said second air-directing member.

2. A device for directing air as recited in claim 1, wherein said side wall extends from said first side at an angle of approximately ninety degrees with said front face of said sheet member.

3. A device for directing air as recited in claim 2, wherein said attachment member extends from said upper end at an angle of approximately ninety degrees with said front face of said sheet member.

4. A device for directing air as recited in claim 3, including a slot disposed through said attachment member for retaining a fastener therein.

5. A device for directing air across the reflective face of an externally mounted rear view mirror, said device comprising:
   a sheet member having a front face, an upper end a first side and a second side;
   a side wall extending from the first side of said sheet member at an angle therewith;
   a first air-directing member extending from the upper end of said sheet member at an angle therewith, wherein said first air-directing member is positioned adjacent the first end of said sheet member and is in abutment with said side wall;
   a second air-directing member extending from said upper end of said sheet member at an angle therewith, wherein said second air-directing member is laterally spaced from said first air-directing member;
   said first air-directing member and said second air-directing member extending from said upper end at an angle of approximately one-hundred-five degrees with said front face of said sheet member;
   an attachment member extending from said upper end of said sheet member at an angle therewith and positioned between said first air-directing member and said second air-directing member; and
   a slot disposed through said attachment member for retaining a fastener therein.

6. A device for directing air as recited in claim 5, wherein said side wall extends from said first side at an angle of approximately ninety degrees with said front face of said sheet member.

7. A device for directing air as recited in claim 5, wherein said attachment member extends from said upper end at an angle of approximately ninety degrees with said front face of said sheet member.

* * * * *